(12) United States Patent
Yuan et al.

(10) Patent No.: US 12,384,686 B2
(45) Date of Patent: Aug. 12, 2025

(54) METHOD FOR PREPARING TS-1 MOLECULAR SIEVE WITH HIERARCHICAL PORES

(71) Applicant: DALIAN INSTITUTE OF CHEMICAL PHYSICS, CHINESE ACADEMY OF SCIENCES, Dalian (CN)

(72) Inventors: Danhua Yuan, Dalian (CN); Jiacheng Xing, Dalian (CN); Yunpeng Xu, Dalian (CN); Zhongmin Liu, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 816 days.

(21) Appl. No.: 17/294,349

(22) PCT Filed: Nov. 15, 2018

(86) PCT No.: PCT/CN2018/115719
§ 371 (c)(1),
(2) Date: May 14, 2021

(87) PCT Pub. No.: WO2020/097876
PCT Pub. Date: May 22, 2020

(65) Prior Publication Data
US 2021/0403332 A1    Dec. 30, 2021

(51) Int. Cl.
*C01B 37/00* (2006.01)
(52) U.S. Cl.
CPC ........ *C01B 37/005* (2013.01); *C01P 2002/74* (2013.01); *C01P 2006/16* (2013.01)

(58) Field of Classification Search
CPC ....... B01J 29/405; B01J 29/89; C01B 37/005; C01B 39/085; C01B 39/48; C01P 2002/74; C01P 2004/64; C01P 2006/16
See application file for complete search history.

(56) References Cited

U.S. PATENT DOCUMENTS

| | | |
|---|---|---|
| 2,920,089 A | 1/1960 | Samour |
| 3,751,504 A | 8/1973 | Keown et al. |
| | (Continued) | |

FOREIGN PATENT DOCUMENTS

| | | |
|---|---|---|
| CN | 1475441 A | 2/2004 |
| CN | 1506340 A | 6/2004 |
| | (Continued) | |

OTHER PUBLICATIONS

Shi et al. CN104609440A English Translation (Year: 2015).*
(Continued)

*Primary Examiner* — Sally A Merkling
*Assistant Examiner* — Jordan W Taylor
(74) *Attorney, Agent, or Firm* — Bayramoglu Law Offices LLC

(57) ABSTRACT

The present application discloses a method for preparing a hierarchical porous TS-1 molecular sieve comprising using a silicon-titanium ester polymer as both titanium source and silicon source. In the method, silicon and titanium are uniformly connected to a same polymer, and the hydrolysis rates thereof are equivalent during hydrolysis, which can prevent $TiO_2$ precipitation and reduce the generation of non-framework titanium. Further, the silicon-titanium ester polymer is not only used as both silicon source and titanium source, but also can be used as a mesoporous template in the synthesis process. The obtained TS-1 molecular sieve has mesoporous structure with narrow pore size distribution.

21 Claims, 2 Drawing Sheets

(56) References Cited

U.S. PATENT DOCUMENTS

| | | |
|---|---|---|
| 3,751,506 A | 8/1973 | Burress et al. |
| 4,016,218 A | 4/1977 | Haag et al. |
| 4,547,605 A | 10/1985 | Kresge et al. |
| 4,891,458 A | 1/1990 | Innes et al. |
| 5,227,558 A | 7/1993 | Shamshoum et al. |
| 9,896,343 B2 | 2/2018 | Xia et al. |
| 10,967,350 B2 | 4/2021 | Zhang et al. |
| 11,179,714 B2 | 11/2021 | Liu et al. |
| 11,311,852 B2 | 4/2022 | Zhang et al. |
| 2004/0059139 A1 | 3/2004 | Cooker et al. |
| 2010/0076207 A1 | 3/2010 | Le-Khac |
| 2020/0179891 A1 | 6/2020 | Zhang et al. |
| 2021/0309590 A1 | 10/2021 | Su et al. |
| 2021/0403333 A1 | 12/2021 | Yuan et al. |
| 2022/0002481 A1 | 1/2022 | Yuan et al. |
| 2022/0002496 A1 | 1/2022 | Xing et al. |
| 2022/0008902 A1 | 1/2022 | Yuan et al. |

FOREIGN PATENT DOCUMENTS

| | | | |
|---|---|---|---|
| CN | 1194944 C | | 3/2005 |
| CN | 1621347 A | | 6/2005 |
| CN | 1751996 A | | 3/2006 |
| CN | 101327934 A | * | 12/2008 |
| CN | 101664695 A | | 3/2010 |
| CN | 101962195 A | | 2/2011 |
| CN | 102040459 A | | 5/2011 |
| CN | 102274746 A | | 12/2011 |
| CN | 102276413 A | | 12/2011 |
| CN | 102872899 A | | 1/2013 |
| CN | 102875315 A | | 1/2013 |
| CN | 103121909 A | | 5/2013 |
| CN | 103408763 A | | 11/2013 |
| CN | 104528759 A | | 4/2015 |
| CN | 104556104 A | * | 4/2015 |
| CN | 104556115 A | | 4/2015 |
| CN | 104609440 A | * | 5/2015 |
| CN | 104843733 A | | 8/2015 |
| CN | 105197956 A | | 12/2015 |
| CN | 105597814 A | | 5/2016 |
| CN | 105665004 A | | 6/2016 |
| CN | 106379912 A | | 2/2017 |
| CN | 106914274 A | | 7/2017 |
| CN | 107032366 A | | 8/2017 |
| CN | 107552087 A | | 1/2018 |
| CN | 106379912 B | | 6/2018 |
| CN | 108658087 A | | 10/2018 |
| CN | 108726528 A | | 11/2018 |
| CN | 108793181 A | | 11/2018 |
| EA | 201000989 A1 | | 2/2011 |
| JP | H08-253313 A | | 10/1996 |
| JP | 2015-110219 A | | 6/2015 |
| JP | 2021523618 A | | 9/2021 |
| JP | 2021524464 A | | 9/2021 |
| KR | 2003-0082022 A | | 10/2003 |
| WO | 2010036296 A1 | | 4/2010 |
| WO | 2010/143043 A1 | | 12/2010 |
| WO | 2011/077240 A1 | | 6/2011 |
| WO | 2016/099408 A1 | | 6/2016 |

OTHER PUBLICATIONS

Shu_et_al._CN104556104A_English_Translation.pdf (Year: 2015).*
Yang_et_al._CN101327934A_English_Translation.pdf (Year: 2008).*
Hu et al. Microporous and Mesoporous Materials 270 (2018) 149-154 (Year: 2018).*
Zhang et al. ACS Omega 2016, 1, 1034-104 (Year: 2016).*
Merriam-Webster, Ester Definition & Meaning, searched prior to Nov. 18, 2018 (Year: 2018).*

Alba-Rubio et al., "Oxidation of furfural in aqueous $H_2O_2$ catalysed by titanium silicalite: Deactivation processes and role of extraframework Ti oxides," *Applied Catalysis B: Enviromental* 202:269-280, 2017.
Danov et al., "Influence of the Conditions for Obtaining a Titanium-Containing Zeolite on Its Catalytic Activity in the Process of Allichloride Epoxidation With Hydrogen Peroxide in Methanol Medium," *Journal of Applied Chemistry* 82(2):1843-1849, 2009. (with English Translation).
Fedosov et al., "Synthesis and characterization of hierarchical titanium-containing silicas using different size templates," *Journal of Chemical Sciences* 131:77, 2019. (9 pages).
Gao et al., "A green template-assisted synthesis of hierarchical TS-1 with excellent catalytic activity and recyclability for the oxidation of 2,3,6-trimethylphenol," *Microporous and Mesoporous Materials* 239:381-389, 2017.
Lv et al., "P123 lamellar micelle-assisted construction of hierarchical TS-1 stacked nanoplates with constrained mesopores for enhanced oxidative desulfurization," *Applied Catalysis A, General* 567:28-35, 2018.
Mikhailovich, "Catalysis in the Gas and Oil Industry Theory and practice," Ministry of Education and Science Russian State University of Oil and Gas, 2012. (3 pages) (with English Translation).
"Synthesis, characterization and catalytic application of hierarchical porous IM-5 and TNU-9 zeolites," Chinese Doctoral Dissertations Full-text Database, Engineering Science and Technology, URL= http://www.cdfd.cnki.net/Journal/Issue.aspx?dbCode=CDFD&PYKM=BBBD&Year=2014&Issue=09&Volume=01&QueryID=26, accessed May 10, 2020, 23 pages. (with English abstract).
Extended European Search Report, dated Mar. 29, 2022, for European Application No. 18927322.0-1104, 8 pages.
Heng, "Synthesis, characterization and catalytic application of hierarchival porous IM-5 and TNU-9 zeolites," doctoral dissertation, Jilin University, Changchun, People's Republic of China, pp. 77-84.
Hong et al., "Synthesis, Crystal Structure, Characterization, and Catalytic Properties of TNU-9," *J. Am. Chem. Soc.* 129:10870-10885, 2007.
Hong et al., "Synthesis, Structure Solution, Characterization, and Catalytic Properties of TNU-10: A High-Silica Zeolite with the STI Topology," *J. Am. Chem. Soc.* 126:5817-5826, Apr. 2004.
Hu et al., "Effect of mesopore structure of TNU-9 on methane dehydroaromatization," *RSC Advances* 4:26577-26584, 2014.
International Search Report, mailed Apr. 22, 2019, for International Application No. PCT/CN2018/097323, 5 pages.
Odedairo et al., "Ethylation of benzene: Effect of zeolite acidity and structure," *Applied Catalysis A: General* 385:31-45, 2010.
Portilla et al., "Structure-reactivity relationship for aromatics transalkylation and isomerization process with TNU-9, MCM-22 and ZSM-5 zeolites, and their industrial implications," *Applied Catalysis A: General* 393:257-268, 2011.
U.S. Appl. No. 17/293,899, filed May 13, 2021.
U.S. Appl. No. 17/293,900, filed May 13, 2021.
U.S. Appl. No. 17/294,357, filed May 14, 2021.
Phonthammachai et al., "Crystallization and catalytic activity of high titanium loaded TS-1 zeolite," *Materials Chemistry and Physics* 97:458-467, 2006.
Saadoun et al., "1,2-Diolates of titanium as suitable precursors for the preparation of photoactive high surface titania," *Applied Catalysis B: Environmental* 21:269-277, 1999.
Shen et al., "Study on Synthesis Technology of Ethylene Glycol Alkoxides," *Chemical World* 52(1):2011, w/ English abstract, (5 pages).
Wang et al., "Hydrothermal Synthesis and Characterization of a Novel One-Dimensional Titanium Glycolate Complex Single Crystal: $Ti(OCH_2CH_2O)2$," *Chemistry of Materials* 11(8):2008-2012, 1999.

* cited by examiner

METHOD FOR PREPARING TS-1 MOLECULAR SIEVE WITH HIERARCHICAL PORES

FIELD

The present application relates to a method for preparing hierarchical porous TS-1 molecular sieve, which belongs to the field of preparation of molecular sieve.

BACKGROUND

TS-1 molecular sieve is a kind of microporous molecular sieve with MFI topological structure. Due to the presence of tetrahedral $Ti^{4+}$ sites in its framework structure, it has a good catalytic effect on the selective oxidation of organic substances in the presence of $H_2O_2$, such as the epoxidation of olefins, the hydroxylation of phenol, the ammoximation of ketones, the oxidation of alkanes and other selective oxidation reactions. The catalytic oxidation process with TS-1 molecular sieve is pollution-free and the reaction conditions are mild, which overcomes the disadvantages of serious pollution and lengthy reaction process in the traditional process.

There are two main factors affecting the activity and stability of TS-1. One is the contents of framework titanium and non-framework titanium in the molecular sieve, and the other is the diffusion performance of the molecular sieve. For the former factor, due to the large radius of titanium atom, it is difficult to enter the MFI framework, and further the titanium source is easily hydrolyzed and polymerized to form titanium dioxide precipitate. Thus, it is difficult to avoid the formation of six-coordinated non-framework titanium during the synthesis of TS-1 molecular sieve. However, the existence of the non-framework titanium can promote the ineffective decomposition of $H_2O_2$, but is not conducive to the oxidation reaction catalyzed by TS-1. For the latter factor, the pore size of TS-1 molecular sieve is too small which refers to only 0.55 nm, which greatly limits the transmission and diffusion of the organic macromolecules in the catalyst and thus inhibits the reaction activity and service life of the catalyst. The synthesis of TS-1 was originally reported by Taramasso et al. (U.S. Pat. No. 4,410,501). The synthesis of TS-1 used tetraethyl orthosilicate (TEOS) as silicon source, tetraethyl titanate (TEOT) as titanium source and tetrapropylammonium hydroxide (TPAOH) as template which were subject to hydrothermal crystallization at a temperature ranging from 130 to 200° C. in a reactor for a time ranging from 6 to 30 days. However, this method is cumbersome to operate, difficult to control conditions and has poor experimental repeatability. In addition, due to the difference in the hydrolysis rates of the silicon source and the titanium source, a large amount of non-framework titanium is formed, which affects the catalytic performance of TS-1 molecular sieve. Subsequently, Thangaraj et al. (*zeolite*, 12(1992), 943) pre-hydrolyzed tetraethyl orthosilicate in TPAOH aqueous solution, and then slowly added therein isopropanol solution of tetrabutyl titanate with a slower hydrolysis rate under vigorous stirring. And, TS-1 molecular sieve with less non-framework titanium was obtained. These improvements are mainly to control the hydrolysis process of the silicon source and the titanium source, so that the hydrolysis rates of the silicon source and the titanium source are more matched to inhibit the formation of non-framework titanium, thereby increasing the framework titanium content in the TS-1 molecular sieve.

For the diffusion problem of TS-1 molecular sieve, it is a common solution to introduce mesopores into the zeolite molecular sieve system to prepare the hierarchical porous molecular sieves. It is currently the most effective way to prepare hierarchical porous molecular sieves by using templates to construct mesoporous or macroporous structures in molecular sieve materials, including soft template method and hard template method. The soft template method is exemplified by Zhou Xinggui et al. (CN103357432A) and Zhang Shufen (CN102910643A), wherein Zhou Xinggui et al. (CN103357432A) uses polyether Pluronic F127 as the mesoporous template to synthesize mesoporous nano-TS-1 molecular sieve by dry gel method, and Zhang Shufen (CN102910643A) uses cetyltrimethylammonium bromide as mesoporous template to introduce mesoporous channels into the titanium silicate molecular sieve. The hard template method is exemplified by Chen Lihua et al. (CN104058423A) and Li Gang et al. (CN101962195A), wherein Chen Lihua et al. (CN104058423A) uses three-dimensional ordered macroporous-mesoporous hierarchical porous carbon material as the hard template to limit the growth of TS-1 nanocrystals in the three-dimensional ordered channels, and then removes the hard template to obtain hierarchical porous TS-1 molecular sieve; and Li Gang et al. (CN101962195A) uses cheap sugar instead of porous carbon materials as macroporous-mesoporous template, which is heated, carbonized and dehydrated to directly form hard template in the process of heat treatment of the TS-1 molecular sieve synthetic gel containing sugar to prepare dry gel, thereby obtaining hierarchical porous TS-1 molecular sieve. However, the activity and stability of the TS-1 molecular sieve need to be further improved.

SUMMARY

According to one aspect of the present application, a method for preparing a hierarchical porous TS-1 molecular sieve is provided. In the method, a silicon-titanium ester polymer is formed by connecting silicon source and titanium source to a same polymer, and the polymer can match the hydrolysis rates of the silicon source and the titanium source more, prevent $TiO_2$ precipitation and facilitate the entry of titanium into the molecular sieve framework. The silicon-titanium ester polymer not only acts as both silicon source and titanium source during the synthesis process, but also can be used as mesoporous template. Therefore, the hierarchical porous TS-1 molecular sieve obtained by this method has a mesoporous structure, narrow pore size distribution and contains less non-framework titanium. The method for preparing the hierarchical porous TS-1 molecular sieve is characterized in that the silicon-titanium ester polymer is used as both titanium source and silicon source.

Optionally, the method comprises crystallizing a mixture containing the silicon-titanium ester polymer, a template and water to obtain the hierarchical porous TS-1 molecular sieve.

Optionally, the crystallization is hydrothermal crystallization.

Optionally, the silicon-titanium ester polymer is obtained by transesterification of raw materials containing silicate, titanate and polyhydric alcohol.

Optionally, a molar ratio of the silicate, titanate and polyhydric alcohol satisfies: titanate:silicate=0.001~0.2; (titanate+silicate):polyhydric alcohol=(0.5-5)x: 4; wherein, x is the number of moles of hydroxyl groups contained in each mole of the polyhydric alcohol; the number of moles of each component mentioned above is calculated by the number of moles of the substance itself.

Optionally, a molar ratio of the silicate, titanate and polyhydric alcohol satisfies: titanate:silicate=0.005~0.1; (titanate+silicate):polyhydric alcohol=(0.8~1.2)x: 4; wherein, x is the number of moles of hydroxyl groups contained in each mole of the polyhydric alcohol; the number of moles of each component mentioned above is calculated by the number of moles of the substance itself.

Optionally, the upper limit of the molar ratio of the titanate to the silicate is 0.002, 0.005, 0.01, 0.02, 0.05, 0.08, 0.1, 0.15, 0.18 or 0.2, and the lower limit thereof is 0.001, 0.002, 0.005, 0.01, 0.02, 0.05, 0.08, 0.1, 0.15 or 0.18.

Optionally, the upper limit of the molar ratio of the (titanate+silicate) to the polyhydric alcohol is 0.85x:4, 0.9x: 4, 0.95x:4, 1.0x:4, 1.15x: 4 or 1.2x:4, and the lower limit thereof is 0.8x:4, 0.85x:4, 0.9x:4, 0.95x:4, 1.0x:4 or 1.15x:4; wherein x is the number of moles of hydroxyl groups contained in each mole of the polyhydric alcohol.

Optionally, the transesterification is carried out under stirring conditions.

Optionally, the conditions of transesterification are: the transesterification is carried out in an inactive atmosphere, a reaction temperature ranges from 80 to 180° C. and a reaction time ranges from 2 to 10 hours.

Optionally, the conditions of the transesterification are: the transesterification is carried out under nitrogen protection, the reaction temperature ranges from 80 to 180° C. and the reaction time ranges from 2 to 10 hours.

Optionally, the conditions for the transesterification are: the transesterification is carried out in an inactive atmosphere, the reaction temperature ranges from 100 to 160° C. and the reaction time ranges from 2 to 10 hours.

Optionally, the conditions for the transesterification are: the transesterification is carried out in an inactive atmosphere, the reaction temperature ranges from 100 to 160° C. and the reaction time ranges from 4 to 8 hours.

Optionally, the conditions of the transesterification are: the transesterification is carried out under nitrogen protection, the reaction temperature ranges from 100 to 160° C. and the reaction time ranges from 4 to 8 hours.

Optionally, the upper limit of the reaction temperature of the transesterification is 85° C., 90° C., 100° C., 110° C., 120° C., 130° C., 140° C., 150° C., 160° C., 170° C., 175° C. or 180° C., and the lower limit thereof is 80° C., 85° C., 90° C., 100° C., 110° C., 120° C., 130° C., 140° C., 150° C., 160° C., 170° C. or 175° C.

Optionally, the upper limit of the reaction time of the transesterification is 2.5 hours, 3 hours, 4 hours, 5 hours, 6 hours, 7 hours, 8 hours, 9 hours, 9.5 hours or 10 hours, and the lower limit thereof is 2 hours, 2.5 hours, 3 hours, 4 hours, 5 hours, 6 hours, 7 hours, 8 hours, 9 hours or 9.5 hours.

Optionally, the inactive atmosphere comprises at least one of nitrogen atmosphere and inert gas atmosphere.

Optionally, the conversion rate of the transesterification ranges from 60% to 80%.

Optionally, the transesterification further comprises performing vacuum distillation thereafter.

Optionally, the conditions of the vacuum distillation comprise that a vacuum degree ranges from 0.01 to 5 kPa, a vacuum distillation temperature ranges from 170 to 230° C., and a vacuum distillation time ranges from 0.5 to 5 hours.

Optionally, the vacuum degree ranges from 0.05 to 3 kPa.

Optionally, the conversion rate of the transesterification is greater than 90%.

Optionally, the upper limit of the vacuum distillation temperature is 175° C., 180° C., 190° C., 200° C., 210° C., 220° C., 225° C. or 230° C., and the lower limit thereof is 170° C., 175° C., 180° C., 190° C., 200° C., 210° C., 220° C. or 225° C.

Optionally, the upper limit of the vacuum distillation time is 0.8 hour, 1 hour, 2 hours, 3 hours, 4 hours, 4.5 hours or 5 hours, and the lower limit thereof is 0.5 hour, 0.8 hour, 1 hour, 2 hours, 3 hours, 4 hours or 4.5 hours.

Optionally, the upper limit of the vacuum degree is 0.02 kPa, 0.03 kPa, 0.05 kPa, 0.08 kPa, 0.1 kPa, 0.5 kPa, 1kPa, 1.5 kPa, 2 kPa, 2.5 kPa, 3 kPa, 3.5 kPa, 4 kPa, 4.5 kPa or 5 kPa, and the lower limit thereof is 0.01 kPa, 0.02 kPa, 0.03 kPa, 0.05 kPa, 0.08 kPa, 0.1 kPa, 0.5 kPa, 1kPa, 1.5 kPa, 2 kPa, 2.5 kPa, 3 kPa, 3.5 kPa, 4 kPa or 4.5 kPa.

Optionally, the silicate is at least one of compounds having a chemical formula shown in Formula I:

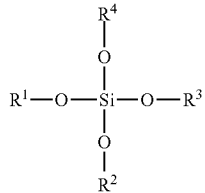

Formula I wherein, $R^1$, $R^2$, $R^3$ and $R^4$ are independently selected from $C_1$ to $C_{10}$ alkyl group.

Optionally, $R^1$, $R^2$, $R^3$ and $R^4$ in Formula I are independently selected from $C_1$ to $C_4$ alkyl group.

Optionally, the silicate comprises at least one of tetramethoxysilane, tetratetraethyl orthosilicate, tetrapropyl silicate and tetrabutyl silicate.

Optionally, the silicate is one or more of tetramethoxysilane, tetratetraethyl orthosilicate, tetrapropyl silicate and tetrabutyl silicate.

Optionally, the titanate is at least one of compounds having a chemical formula shown in Formula II:

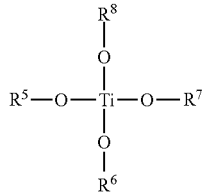

Formula II wherein, $R^5$, $R^6$, $R^7$ and $R^8$ are independently selected from $C_1$ to $C_{10}$ alkyl group.

Optionally, $R^5$, $R^6$, $R^7$ and $R^8$ in Formula II are independently selected from $C_1$ to $C_4$ alkyl group.

Optionally, the titanate includes at least one of tetraethyl titanate, tetraisopropyl titanate, tetrabutyl titanate, tetrahexyl titanate, and tetraisooctyl titanate.

Optionally, the titanate comprises at least one of tetraethyl titanate, tetraisopropyl titanate, tetrabutyl titanate, tetrahexyl titanate and tetraisooctyl titanate.

Optionally, the polyhydric alcohol comprises at least one of ethylene glycol, diethylene glycol, triethylene glycol, tetraethylene glycol, 1,2-propanediol, 1,3-propanediol, 1,4-butylene glycol, 1,6-hexanediol, polyethylene glycol 200, polyethylene glycol 400, polyethylene glycol 600, polyethylene glycol 800, 1,4-cyclohexanediol, 1,4-cyclohexane dimethanol, terephthalyl alcohol, glycerin, trimethylolpropane, pentaerythritol, xylitol and sorbitol.

Optionally, the number of hydroxyl groups contained in the polyhydric alcohol is ≥2, and the polyhydric alcohol comprises at least one of ethylene glycol, diethylene glycol, triethylene glycol, tetraethylene glycol, 1,2-propanediol, 1,3-propanediol, 1,4-butylene glycol, 1,6-hexanediol, polyethylene glycol 200, polyethylene glycol 400, polyethylene glycol 600, polyethylene glycol 800, 1,4-cyclohexanediol, 1,4-cyclohexane dimethanol, terephthalyl alcohol, glycerin, trimethylolpropane, pentaerythritol, xylitol and sorbitol.

Optionally, the silicon-titanium ester polymer comprises at least one of silicon-titanium polyethylene glycol polyester, silicon-titanium ethylene glycol polyester and silicon-titanium terephthalyl alcohol polyester. Optionally, the method for preparing the silicon-titanium ester polymer comprises mixing silicate, titanate and polyhydric alcohol, and then performing the transesterification under stirring conditions and in an inactive protection atmosphere, wherein the reaction temperature ranges from 80 to 180° C., and the reaction time ranges from 2 to 10 hours.

Optionally, the method for preparing silicon-titanium ester polymer further comprises: after transesterification mentioned above, performing vacuum distillation to prepare the silicon-titanium ester polymer, during which a vacuum degree ranges from 0.01 to 5 kPa, a reaction temperature ranges from 170 to 230° C., and a reaction time ranges from 0.5 to 5 hours.

As a specific embodiment, the method for preparing the silicon-titanium ester polymer comprises the following steps:

1) mixing silicate, titanate and polyhydric alcohol uniformly in a three-necked flask, and performing the transesterification under stirring conditions during which a distillation device is connected to the three-necked flask and nitrogen is passed in the three-necked flask for protection, wherein the reaction temperature ranges from 80 to 180° C., the reaction time ranges from 2 to 10 hours, and the conversion rate of the transesterification ranges from 60% to 80%;

2) after step 1), connecting the distillation device to the water pump or oil pump for vacuum distillation to make the transesterification more complete to obtain the silicon-titanium ester polymer, wherein the vacuum degree is controlled to range from 0.01 to 5 kPa, the reaction temperature ranges from 170 to 230° C., the reaction time ranges from 0.5 to 5 hours, and the conversion rate of the transesterification is greater than 90%.

Optionally, a molar ratio of the silicon-titanium ester polymer, template and water satisfies: template:silicon-titanium ester polymer=0.05-10; water:silicon-titanium ester polymer=5~500; wherein, the number of moles of the template is based on the number of moles of N atom in the template; the number of moles of the silicon-titanium ester polymer is based on the sum of silicon content and titanium content in the silicon-titanium ester polymer; the silicon content in the silicon-titanium ester polymer is calculated by the number of moles of $SiO_2$, and the titanium content in the silicon-titanium ester polymer is calculated by the number of moles of $TiO_2$; the number of moles of the water is based on the number of moles of $H_2O$ itself.

Optionally, the upper limit of the molar ratio of the template to the silicon-titanium ester polymer is 0.08, 0.10, 0.15, 0.2, 0.5, 1.0, 2.0, 3.0, 4.0, 5.0, 6.0, 7.0, 8.0, 9.0 or 10.0, and the lower limit thereof is 0.05, 0.08, 0.10, 0.15, 0.2, 0.5, 1.0, 2.0, 3.0, 4.0, 5.0, 6.0, 7.0, 8.0 or 9.0; wherein, the number of moles of the template is calculated by the number of moles of N atom in the template, the number of moles of the silicon-titanium ester polymer is calculated by the sum of the silicon content and the titanium content in the silicon-titanium ester polymer, the silicon content in the silicon-titanium ester polymer is based on the number of moles of $SiO_2$, and the titanium content in the silicon-titanium ester polymer is based on the number of moles of $TiO_2$.

Optionally, the upper limit of the molar ratio of water to the silicon-titanium ester polymer is 8, 10, 30, 50, 80, 100, 150, 200, 250, 300, 350, 400, 450, 480 or 500, and the lower limit thereof is 5, 8, 10, 30, 50, 80, 100, 150, 200, 250, 300, 350, 400, 450 or 480; wherein, the number of moles of the silicon-titanium ester polymer is calculated by the sum of the silicon content and the titanium content in the silicon-titanium ester polymer, the silicon content in the silicon-titanium ester polymer is calculated by the number of moles of $SiO_2$, the content of titanium in the silicon-titanium ester polymer is calculated by the number of moles of $TiO_2$, and the number of moles of the water is calculated by the number of moles of $H_2O$ itself.

Optionally, a molar ratio of the silicon-titanium ester polymer, template and water satisfies: template:silicon-titanium ester polymer=0.1~5; water: silicon-titanium ester polymer=30~300; wherein, the number of moles of the template is based on the number of moles of N atom in the template; the number of moles of the silicon-titanium ester polymer is based on the sum of silicon content and titanium content in the silicon-titanium ester polymer; the silicon content in the silicon-titanium ester polymer is calculated by the number of moles of $SiO_2$, and the titanium content in the silicon-titanium ester polymer is calculated by the number of moles of $TiO_2$, and the number of moles of the water is based on the number of moles of $H_2O$ itself.

Optionally, the template refers to at least one of organic base templates.

Optionally, the molar ratio of silicon-titanium ester polymer, the organic base template and water satisfies: the organic base template/($SiO_2$+$TiO_2$)=0.05~10; $H_2O$/($SiO_2$+$TiO_2$)=5~500; wherein, the silicon content in the silicon-titanium ester polymer is calculated by the number of moles of $SiO_2$, the titanium content in the silicon-titanium ester polymer is calculated by the number of moles of $TiO_2$ and the content of the organic base template is calculated by the number of moles of N atom.

Optionally, the organic base template includes A which is at least one of tetraethylammonium hydroxide, tetrapropylammonium hydroxide, tetrabutylammonium hydroxide, triethylpropylammonium hydroxide, tetrapropylammonium halide, tetraethylammonium halide, tetrabutylammonium halide and triethylpropylammonium halide.

Optionally, the organic base template further includes B which is at least one of aliphatic amine and alcohol amine compounds.

Optionally, the B includes at least one of ethylamine, diethylamine, triethylamine, n-butylamine, butanediamine, hexamethylenediamine, octanediamine, monoethanolamine, diethanolamine and triethanolamine.

Optionally, the organic base template is at least one of tetraethylammonium hydroxide, tetrapropylammonium hydroxide, tetrabutylammonium hydroxide, triethylpropylammonium hydroxide, tetrapropylammonium halide, tetraethylammonium halide, tetrabutylammonium halide, triethylpropylammonium halide and the like; alternatively, the organic base template is a mixture of these quaternary ammonium salts or quaternary ammonium bases and aliphatic amine or alcohol amine compounds which is exemplified as ethylamine, diethylamine, triethylamine, n-butylamine, butanediamine, hexamethylenediamine, octanediamine, monoethanolamine, diethanolamine and triethanolamine.

Optionally, the conditions of crystallization are: the crystallization is conducted in sealed condition, a crystallization temperature ranges from 100 to 200° C., and the crystallization time under autogenous pressure does not exceed 30 days.

Optionally, the conditions of crystallization are: the crystallization is conducted in sealed condition, a crystallization temperature ranges from 120 to 180° C., and the crystallization time under autogenous pressure ranges from 1 to 15 days.

Optionally, the upper limit of the crystallization temperature is 110° C., 120° C., 130° C., 140° C., 150° C., 160° C., 170° C., 180° C., 190° C. or 200° C., and the lower limit thereof is 100° C., 110° C., 120° C., 130° C., 140° C., 150° C., 160° C., 170° C., 180° C. or 190° C.

Optionally, the upper limit of the crystallization time is 1 hour, 5 hours, 10 hours, 15 hours, 20 hours, 1 day, 2 days, 5 days, 10 days, 12 days, 15 days, 20 days, 25 days, 28 days or 30 days; and the lower limit thereof is 0.5 hour, 1 hour, 5 hours, 10 hours, 15 hours, 20 hours, 1 day, 2 days, 5 days, 10 days, 12 days, 15 days, 20 days, 25 days or 28 days.

Optionally, the crystallization is performed dynamically or statically.

Optionally, the mixture is subject to aging or not subject to aging to obtain a gel mixture.

Optionally, the mixture undergoes crystallization after aging, and the conditions of aging are that an aging temperature is not higher than 120° C. for an aging time in a range from 0 to 100 hours.

Optionally, the aging temperature ranges from 0 to 120° C. for the aging time in a range from 0 to 100 hours.

Optionally, the conditions of aging are the aging temperature ranges from 20 to 100° C. for the aging time in a range from 1 to 50 hours.

Optionally, the aging is performed dynamically or statically.

Optionally, after the crystallization is completed, the solid product is separated, washed to be neutral, dried to obtain the TS-1 molecular sieve.

Optionally, the method for preparing the TS-1 molecular sieve comprises:
a) mixing silicate, titanate and polyhydric alcohol, and then performing the transesterification under stirring conditions and in an nitrogen atmosphere for protection, wherein the reaction temperature ranges from 80 to 180° C., and the reaction time ranges from 2 to 10 hours;
b) after the reaction in step a), performing vacuum distillation to prepare the silicon-titanium ester polymer, during which a vacuum degree ranges from 0.01 to 5 kPa, a reaction temperature ranges from 170 to 230° C., and a reaction time ranges from 0.5 to 5 hours.
c) mixing the silicon-titanium ester polymer obtained in step b) with an organic base template and water, and keeping the obtained mixture at a temperature not higher than 120° C. for aging for a time in a range from 0 to 100 hours to obtain a gel mixture;
d) crystalizing the gel mixture obtained in step c) under sealed conditions to obtain the TS-1 molecular sieve, wherein the crystallization temperature is raised to a range from 100 to 200° C., a crystallization time ranges from 0 to 30 days under autogenous pressure.

As a specific embodiment, the method for preparing the TS-1 molecular sieve comprises following steps:
a') mixing silicate, titanate and polyhydric alcohol uniformly in a three-necked flask, and performing the transesterification under stirring conditions during which a distillation device is connected to the three-necked flask and nitrogen is passed in the three-necked flask for protection, wherein the reaction temperature ranges from 80 to 180° C., the reaction time ranges from 2 to 10 hours, and the conversion rate of the transesterification ranges from 60% to 80%;
b') after step a'), connecting the distillation device to the water pump or oil pump for vacuum distillation to make the transesterification more complete to obtain the silicon-titanium ester polymer, wherein the vacuum degree is controlled to range from 0.01 to 5 kPa, the reaction temperature ranges from 170 to 230° C., the reaction time ranges from 0.5 to 5 hours, and the conversion rate of the transesterification is greater than 90%.
c') mixing the silicon-titanium ester polymer obtained in step b'), with an organic base template and water, and keeping the obtained mixture at a temperature not higher than 120° C. for stirring or static aging for a time in a range from 0 to 100 hours to obtain a gel mixture;
d') transferring the gel mixture obtained in step c') into an autoclave which is then sealed, and crystalizing the gel mixture under the condition that the crystallization temperature is raised to a range from 100 to 200° C., a crystallization time ranges from 0 to 30 days under autogenous pressure; and
e') after the crystallization is completed, separating the solid product, washing the same with deionized water to be neutral, and drying the same to obtain the hierarchical porous TS-1 molecular sieve.

Optionally, the TS-1 molecular sieve comprises mesopores, and the pore diameter thereof ranges from 2 to 10 nm.

Optionally, the TS-1 molecular sieve comprises mesopores, and the pore diameter thereof ranges from 2 to 5 nm.

Optionally, the TS-1 molecular sieve comprises mesopores, and the pore diameter thereof ranges from 2 to 3 nm.

Optionally, the particle size of the hierarchical porous TS-1 molecular sieve ranges from 100 to 500 nm.

Optionally, the particle size of the hierarchical porous TS-1 molecular sieve ranges from 100 to 300 nm.

Optionally, the hierarchical porous TS-1 molecular sieve has a mesoporous structure with a narrower pore size distribution and less non-framework titanium.

Optionally, the hierarchical porous TS-1 molecular sieve is used for the selective oxidation reaction of organic substances in the presence of $H_2O_2$.

The preparation process of the hierarchical porous TS-1 molecular sieve in the present invention is divided into two steps: the first step refers to performing transesterification of the silicate, titanate and polyhydric alcohol, and distilling the produced alcohol to obtain the silicon-titanium ester polymer; and the second step refers to hydrothermally crystallizing the silicon-titanium ester polymer, the organic base template and water in a reactor to obtain the hierarchical porous TS-1 molecular sieve. Compared with the conventional preparation process, silicon and titanium are uniformly connected to a same polymer, and the hydrolysis rates of silicon and titanium are equivalent which can prevent the $TiO_2$ precipitation and reduce the formation of non-framework titanium; and a new type of silicon-titanium ester polymer is not only used as a source of silicon and titanium, but also used as a mesoporous template. The obtained TS-1 molecular sieve has mesoporous structure and narrow pore size distribution.

In the present application, "$C_1$~$C_{10}$ and $C_1$~$C_4$" and the like all refer to the number of carbon atoms contained in the alkyl group.

In present disclosure, "alkyl group" refers to a group obtained from an alkane compound by losing one H atom.

The benefits achieved by the present application comprises:

1) In the method of the present application, silicon and titanium are uniformly connected to a same polymer, and thus the hydrolysis rates are equivalent during hydrolysis, which can prevent $TiO_2$ precipitation and the formation of non-framework titanium;

2) In the method of the present application, the silicon-titanium ester polymer not only is used as both silicon source and titanium source, but also can be used as mesoporous template. The obtained TS-1 molecular sieve has a mesoporous structure and narrow pore size distribution.

DETAILED DESCRIPTION

Figure 1:
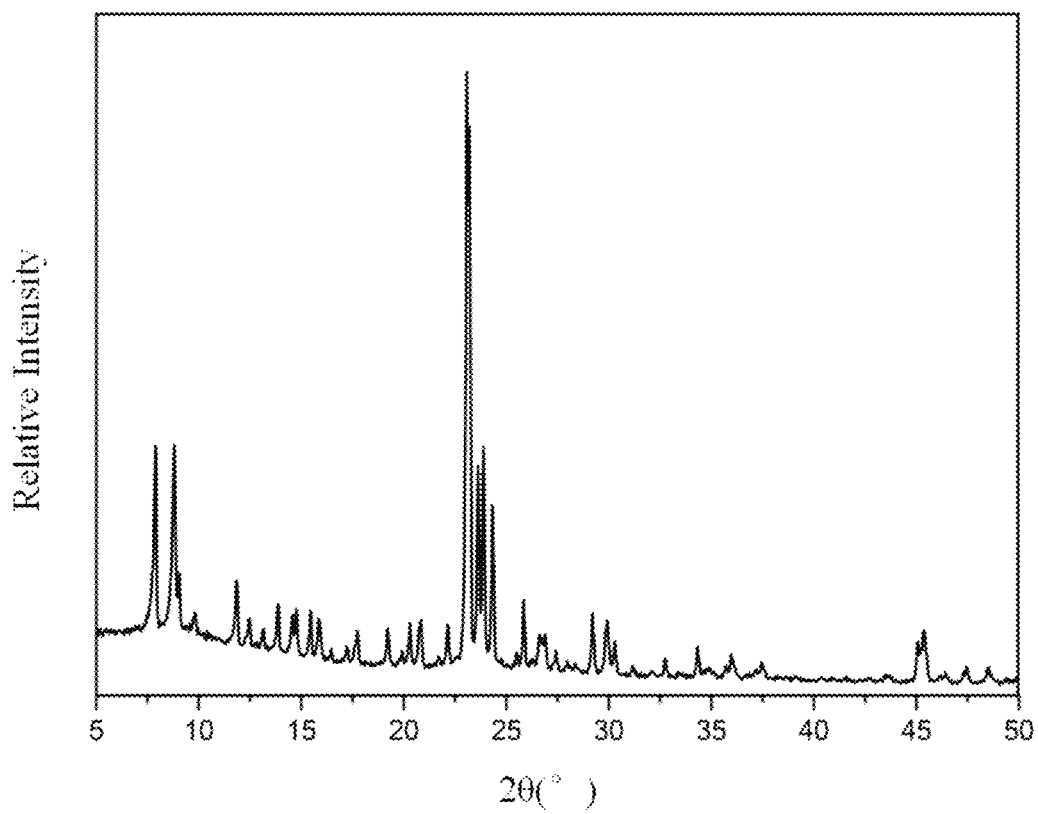
FIG. 1 shows XRD pattern of the product prepared according to Example 1 of the present invention.

The present application will be described in detail below with reference to the examples, but the present application is not limited to these examples.

Unless otherwise specified, the raw materials in the examples of the present application are all commercially available.

In the examples of the present application, the X-Ray Diffraction Analysis (XRD) of the product is performed by the X' Pert PRO X-Ray Diffractometer from PANalytical Company, wherein the XRD is performed under conditions of the Cu target Kα radiation source ($\lambda$=0.15418 nm), electric voltage=40 KV, and electric current=40 mA.

In the present application, the SEM image of the product is obtained by Hitachi SU8020 SEM.

In the examples of the present application, the ultraviolet-visible diffuse reflectance spectrum of the product is measured on a Varian Cary500 Scan UV-Vis spectrophotometer equipped with an integrating sphere.

In the examples of the present application, the physical adsorption, external specific surface area and pore size distribution analysis of the product are performed by the ASAP2020 automatic physics instrument from Mike.

The conversion rate of the transesterification in the Examples of the present application is calculated as follows: according to the number of moles n of the by-product alcohols distilled out during the reaction, the number of groups participating in the transesterification is determined to be n, and the total number of moles of silicate and titanate in the reaction raw materials is m, and then the conversion rate of the transesterification is n/4 m.

According to an embodiment of the present application, the method for preparing the hierarchical porous TS-1 molecular sieve is as follows:

a) mixing silicate, titanate and polyhydric alcohol uniformly in a three-necked flask, and performing the transesterification under stirring conditions during which a distillation device is connected to the three-necked flask and nitrogen is passed in the three-necked flask for protection, wherein the reaction temperature ranges from 80 to 180° C., the reaction time ranges from 2 to 10 hours, and the conversion rate of the transesterification ranges from 60% to 80%;

b) after step a), connecting the distillation device to the water pump or oil pump for vacuum distillation to make the transesterification more complete to obtain the silicon-titanium ester polymer, wherein the vacuum degree is controlled to range from 0.01 to 5 kPa, the reaction temperature ranges from 170 to 230° C., the reaction time ranges from 0.5 to 5 hours, and the conversion rate of the transesterification is greater than 90%;

c) mixing the silicon-titanium ester polymer obtained in step b) with an organic base template and water, and keeping the obtained mixture at a temperature not higher than 120° C. for aging for a time in a range from 0 to 100 hours to obtain a gel mixture;

d) transferring the gel mixture obtained in step c) into a autoclave which is then sealed, and crystalizing the gel mixture under the condition that the crystallization temperature is raised to a range from 100 to 200° C., a crystallization time ranges from 0 to 30 days under autogenous pressure;

e) after the crystallization is completed, separating the solid product, washing the same with deionized water to be neutral, and drying the same to obtain the hierarchical porous TS-1 molecular sieve;

wherein, the silicate in step a) is one or more of tetramethoxysilane, tetratetraethyl orthosilicate, tetrapropyl silicate and tetrabutyl silicate;

the titanate in step a) is at least one of tetraethyl titanate, tetraisopropyl titanate, tetrabutyl titanate, tetrahexyl titanate and tetraisooctyl titanate;

the formula of the polyhydric alcohol in step a) is R—$(OH)_x$, wherein x ≥2; the polyhydric alcohol comprises at least one of ethylene glycol, diethylene glycol, triethylene glycol, tetraethylene glycol, 1,2-propanediol, 1,3-propanediol, 1,4-butylene glycol, 1,6-hexanediol, polyethylene glycol 200, polyethylene glycol 400, polyethylene glycol 600, polyethylene glycol 800, 1,4-cyclohexanediol, 1,4-cyclohexane dimethanol, terephthalyl alcohol, glycerin, trimethylolpropane, pentaerythritol, xylitol and sorbitol.

Preferably, in the step a), the molar ratio of the silicate, titanate and polyhydric alcohol satisfies: $Ti(OR)_4/Si(OR)_4$=0.005~0.1,$[Ti(OR)_4+Si(OR)_4]/R$—$(OH)_x$=(0.8-1.2)x/4.

Preferably, the reaction in step a) is carried out under nitrogen atmosphere, a reaction temperature ranges from 80 to 180° C. and the reaction time ranges from 2 to 10 hours.

Preferably, the conversion rate of the transesterification in step a) ranges from 65% to 80%.

Preferably, the step b) is carried out under vacuum distillation conditions, and the vacuum degree thereof ranges from 0.05 to 3 kPa.

Preferably, in step b), the reaction temperature ranges from 170 to 230° C., and the reaction time ranges from 0.5 to 5 hours.

Preferably, the conversion rate of the transesterification in step b) is greater than 90%.

Preferably, in step c), the molar ratio of the silicon-titanium ester polymer, organic base template and water satisfies: organic base template/($SiO_2$+$TiO_2$)=0.1~5, $H_2O$/($SiO_2$+$TiO_2$)=30~300; wherein, the silicon content in the silicon-titanium ester polymer is calculated by the number of moles of $SiO_2$, the titanium content in the silicon-titanium ester polymer is calculated by the number of moles of $TiO_2$ and the content of the organic base template is calculated by the number of moles of N atom;

wherein, the organic base template used in step c) is at least one of tetraethylammonium hydroxide, tetrapropylammonium hydroxide, tetrabutylammonium hydroxide, triethylpropylammonium hydroxide, tetrapropylammonium halide, tetraethylammonium halide, tetrabutylammonium halide, triethylpropylammonium halide and the like; alternatively, the organic base template is a mixture of these quaternary ammonium salts or quaternary ammonium bases and aliphatic amine or alcohol amine compounds which is exemplified as ethylamine, diethylamine, triethylamine, n-butylamine, butanediamine, hexamethylenediamine, octanediamine, monoethanolamine, diethanolamine and triethanolamineand the like.

Preferably, the aging process in step c) can be omitted or can be carried out, wherein an aging temperature ranges from 20 to 100° C., and an aging time ranges from 1 to 50 hours.

Preferably, the aging process in step c) is performed statically or dynamically.

Preferably, in step d), the crystallization temperature ranges from 120 to 180° C., and the crystallization time ranges from 1 to 15 days.

Preferably, the crystallization process in step d) is performed statically or dynamically.

Preferably, the hierarchical porous TS-1 molecular sieve obtained in the step e) has a mesoporous structure with a narrower pore size distribution and less non-framework titanium.

Example 1

Figure 2:
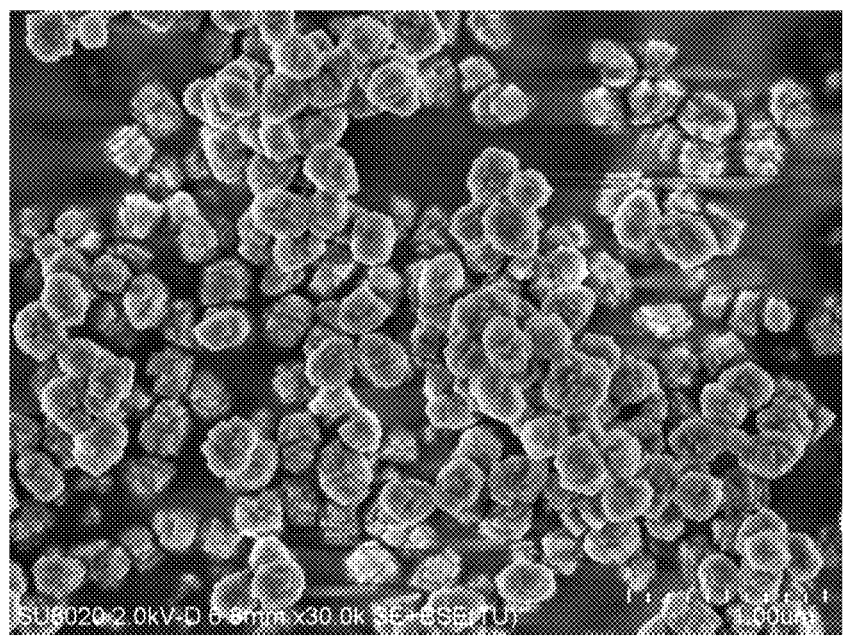
FIG. 2 shows SEM image of the product prepared according to Example 1 of the present invention.
Figure 3:
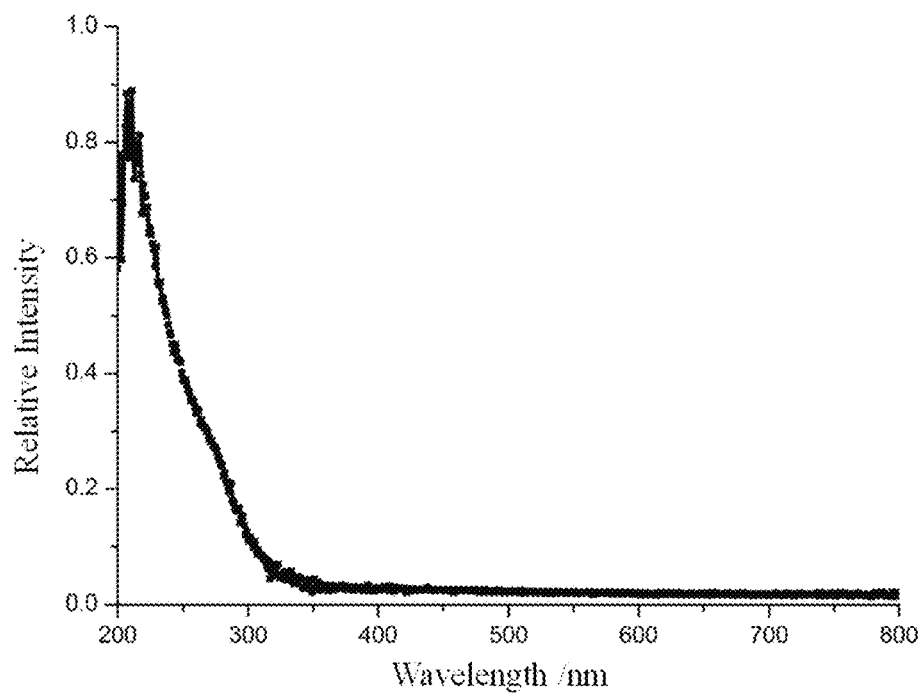
FIG. 3 shows ultraviolet-visible (UV-VIS) spectrum of the product prepared according to Example 1 of the present invention.
Figure 4:
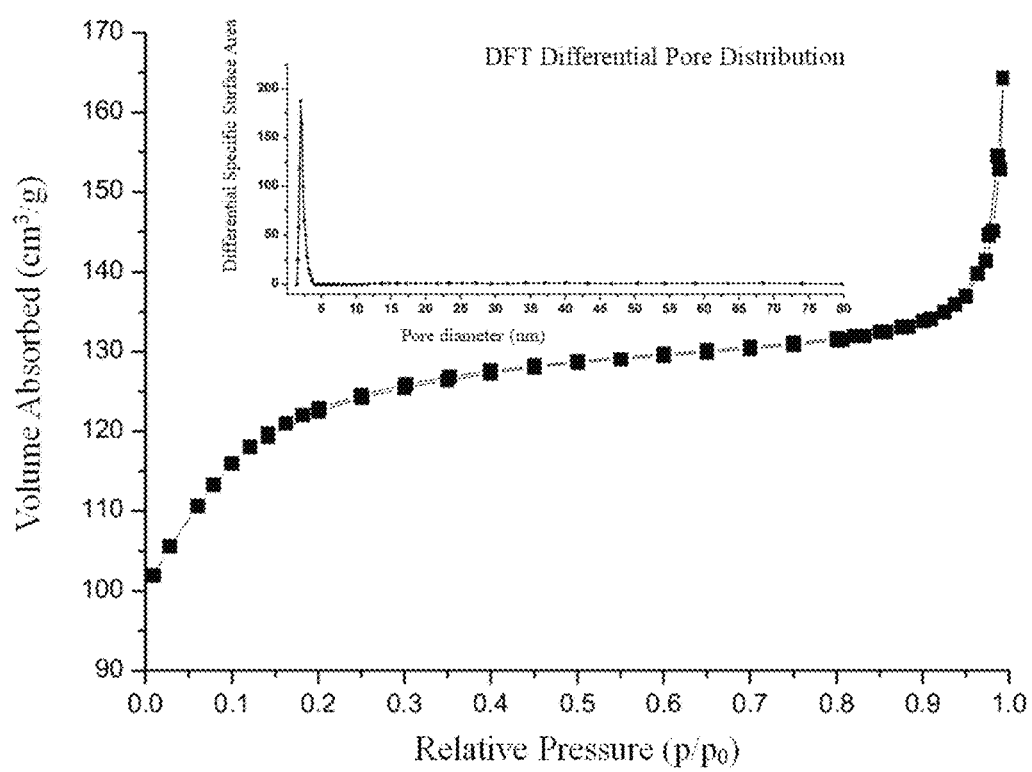
FIG. 4 shows the results of physical adsorption and pore size distribution of the product prepared according to Example 1 of the present invention.

The specific process is as follows: 5 g tetraethyl orthosilicate, 0.29 g tetraethyl titanate and 10 g polyethylene glycol 200 are added into a three-necked flask and mixed uniformly to carry out the transesterification under stirring conditions and nitrogen protection. The three-necked flask is connected to a distillation device. The temperature is heated up to 175° C., the reaction time is 5 hours, and the conversion rate of the transesterification is 75%. Then a water pump is connected to distillation device to perform vacuum distillation and further make transesterification more complete, wherein the vacuum degree of the reaction system was controlled to be 3 kPa and the temperature was raised to 200° C. After reacting for 1 hour, the conversion rate of the transesterification is 92% and the silicon-titanium polyethylene glycol ester polymer is obtained. The obtained silicon-titanium polyethylene glycol ester polymer, 8 g tetrapropylammonium hydroxide (25 wt % aqueous solution) and 12 g water are mixed. The obtained mixture is subjected to aging process at room temperature for 2 hours under stirring conditions, and then is transferred to a stainless steel autoclave, wherein the molar ratio of all components therein is $Ti_{0.05}(PEG-200)_2Si_{0.95}$:0.4TPAOH:40$H_2O$. The autoclave is sealed and placed in an oven that has been raised to a constant temperature of 170° C., and crystallization under autogenous pressure is performed for 2 days. After crystallization is completed, the solid product is separated by centrifugation, washed with deionized water to be neutral, and dried in air at 110° C. to obtain a hierarchical porous TS-1 molecular sieve which is labeled as C1. The obtained hierarchical porous TS-1 molecular sieve (sample C1) is subject to XRD analysis, the result of which is shown in FIG. 1. As can be seen from FIG. 1, the obtained sample is proved to be TS-1 molecular sieve. The SEM image of the obtained hierarchical porous TS-1 molecular sieve is shown in FIG. 2. As can be seen from FIG. 2, the particle size thereof is around 200 nm. The UV-VIS diffuse reflectance spectrum of the obtained hierarchical porous TS-1 molecular sieve is shown in FIG. 3. As can be seen from FIG. 3, almost no non-framework titanium exists in the obtained hierarchical porous TS-1 molecular sieve. The physical adsorption and pore distribution curves of the sample C1 are shown in FIG. 4. As can be seen from FIG. 4, the obtained hierarchical porous TS-1 molecular sieve has mesopores of about 2 nm.

Example 2

The specific process is as follows: 5 g tetraethyl orthosilicate, 0.05 g tetraethyl titanate and 3.13 g ethylene glycol are added into a three-necked flask and mixed uniformly to carry out the transesterification under stirring conditions and nitrogen protection. The three-necked flask is connected to a distillation device. The temperature is heated up to 100° C., the reaction time is 5 hours, and the conversion rate of the transesterification is 70%. Then a water pump is connected to distillation device to perform vacuum distillation and further make transesterification more complete, wherein the vacuum degree of the reaction system was controlled to be 3 kPa and the temperature was raised to 170° C. After reacting for 1 hour, the conversion rate of the transesterification is 90% and the silicon-titanium ethylene glycol ester polymer is obtained. The obtained silicon-titanium ethylene glycol ester polymer, 2 g tetrapropylammonium hydroxide (25 wt % aqueous solution) and 3 g water are mixed. The obtained mixture is subjected to aging process at room temperature for 2 hours under stirring conditions, and then is transferred to a stainless steel autoclave, wherein the molar ratio of all components therein is $Ti_{0.01}(OCH_2CH_2O)_2Si_{0.99}$:0.1TPAOH:10$H_2O$. The autoclave is sealed and placed in an oven that has been raised to a constant temperature of 120° C., and crystallization under autogenous pressure is performed for 15 days. After crystallization is completed, the solid product is separated by centrifugation, washed with deionized water to be neutral, and dried in air at 110° C. to obtain a hierarchical porous TS-1 molecular sieve which is labeled as C2.

Example 3

The specific process is as follows: 5 g tetramethoxysilane, 2.8 g tetrabutyl titanate and 11.35 g terephthalyl alcohol are added into a three-necked flask and mixed uniformly to carry out the transesterification under stirring conditions and nitrogen protection. The three-necked flask is connected to a distillation device. The temperature is heated up to 160° C., the reaction time is 5 hours, and the conversion rate of the transesterification is 80%. Then a water pump is connected to distillation device to perform vacuum distillation and further make transesterification more complete, wherein the vacuum degree of the reaction system was controlled to be 3 kPa and the temperature was raised to 230° C. After reacting for 1 hour, the conversion rate of the transesterification is 95% and the silicon-titanium terephthalyl alcohol ester polymer is obtained. The obtained silicon-titanium terephthalyl alcohol ester polymer, 330 g tetrapropylammonium hydroxide (25 wt % aqueous solution) and 120 g water are mixed uniformly. The obtained mixture is subjected to aging process at room temperature for 2 hours under stirring conditions, and then is transferred to a stainless steel autoclave, wherein the molar ratio of all components therein is $Ti_{0.2}(OC_6H_4O)_2Si_{0.8}:10TPAOH:500H_2O$. The autoclave is sealed and placed in an oven that has been raised to a constant temperature of 180° C., and crystallization under autogenous pressure is performed for 1 day. After crystallization is completed, the solid product is separated by centrifugation, washed with deionized water to be neutral, and dried in air at 110° C. to obtain a hierarchical porous TS-1 molecular sieve which is labeled as C3.

The crystallization in Examples 1 to 3 is static crystallization.

Example 4

The hierarchical porous TS-1 molecular sieve in the present example was prepared by the similar method to in Example 1. The specific preparation conditions different from Example 1 are shown in Tables 1 and 2.

TABLE 1

Parameters and conditions for preparing silicon-titanium ester polymer

| Numbering | Silicate, titanate, polyhydric alcohol and the molar ratio thereof | Reaction temperature | Reaction time | Vacuum distillation temperature | Vacuum distillation time | Vacuum degree of vacuum distillation |
|---|---|---|---|---|---|---|
| 1# | Tetrapropyl silicate:tetraisopropyl titanate:glycerol = 2.4:0.6:4 | 80° C. | 10 hours | 180° C. | 3 hours | 0.01 kPa |
| 2# | tetrabutyl silicate:tetrahexyl titanate:pentaerythritol = 0.75:0.25:1 | 90° C. | 8 hours | 210° C. | 2.5 hours | 0.05 kPa |
| 3# | tetrapropyl silicate:tetraisooctyl titanate:1,2-propanediol = 0.8:0.2:2 | 120° C. | 4 hours | 170° C. | 5 hours | 5 kPa |
| 4# | tetrabutyl silicate:tetrahexyl titanate:1,4-cyclohexanediol = 0.7:0.3:2 | 180° C. | 2 hours | 230° C. | 0.5 hour | 1.5 kPa |

TABLE 2

Conditions for preparing hierarchical porous TS-1 molecular sieve

| Numbering | silicon-titanium ester polymer, organic base template, water and the molar ratio thereof | Aging temperature, aging time | Crystallization temperature, crystallization time |
|---|---|---|---|
| C4 | 1#: tetrabutylammonium hydroxide (10 wt % aqueous solution):water = 1:1.5:20 | 20° C., 50 hours, static aging | 100° C., 30 days |
| C5 | 2#: tetraethylammonium hydroxide (25 wt % aqueous solution):water = 1:0.6:40 | // | 150° C., 10 days |
| C6 | 3#: tetrabutylammonium hydroxide (10 wt % aqueous solution) + diethanolamine:water = 1:2:50 | 120° C., 1 hour, static aging | 200° C., 5 days |
| C7 | 4#: tetraethylammonium hydroxide (25 wt % aqueous solution) + diethylamine:water = 1:1:10 | 100° C.,10 hours, static aging | 180° C., 8 days |

The crystallization in Example 4 is performed dynamically, which is performed by using a rotating oven. The crystallization temperature and crystallization time are shown in table 2, and the rotation speed of the rotating oven is 35 rpm.

Example 5 Phase Structure Analysis

The samples C1 to C7 prepared in Example 1 to Example 4 are subjected to XRD phase structure analysis respectively, results of which are typically shown in FIG. 1. FIG. 1 shows the XRD pattern of the sample C1 prepared in Example 1. As can be seen from FIG. 1, the sample in Example 1 is proved to be TS-1 molecular sieve.

The test results of other samples are only slightly different from the samples in Example 1 in terms of the intensity of the diffraction peaks, and they are all proved to be TS-1 molecular sieves.

Example 6 Morphology Test

The samples C1 to C7 prepared in Example 1 to Example 4 are subjected to SEM morphology analysis respectively, results of which are typically shown in FIG. 2. FIG. 2 shows the SEM spectrum of the sample C1 prepared in Example 1. As can be seen from FIG. 2, the particle size of the sample in Example 1 is about 200 nm.

The test results of other samples are similar to the test result of the sample C1 in Example 1, and the particle size of the samples ranges from 100 to 500 nm.

Example 7 Spectrum Analysis

The samples C1 to C7 prepared in Example 1 to Example 4 were subjected to UV-VIS diffuse reflectance spectrum analysis respectively, results of which are typically shown in FIG. 3. FIG. 3 shows UV-VIS diffuse reflectance spectrum of the sample C1 prepared in Example 1. As can be seen from FIG. 3, the sample of Example 1 almost has no non-framework titanium.

The test results of other samples are similar to those of the sample C1 in Example 1, and there is almost no non-framework titanium in the sample.

Example 8 Pore Size Distribution Analysis

The samples prepared in Example 1 to Example 4 are subjected to physical adsorption and pore size distribution analysis respectively, results of which are typically shown in FIG. 4. FIG. 4 shows the results of physical adsorption and pore distribution of the sample C1 prepared in Example 1. As can be seen from FIG. 4, the sample has mesopores of about 2 nm.

The test results of other samples are similar to the test result of sample C1 in Example 1, and the samples all have mesopores of which the pore sizes range from 2 to 10 nm.

The above examples are only illustrative, and do not limit the present application in any form. Any change or modification, made by the skilled in the art based on the technical content disclosed above, without departing from the spirit of the present application, is equivalent example and falls within the scope of the present application.

What is claimed is:

1. A method for preparing a hierarchical porous TS-1 molecular sieve comprising using a silicon-titanium ester polymer as both titanium source and silicon source; the method for preparing the silicon-titanium ester polymer comprises mixing silicate, titanate, and polyhydric alcohol, and then performing a reaction under stirring conditions and in an inactive atmosphere, wherein the reaction temperature ranges from 80 to 180° C. and the reaction time ranges from 2 to 10 hours;

wherein a molar ratio of the silicate, titanate and polyhydric alcohol satisfies:

titanate:silicate=0.001–0.2;

(titanate+silicate):polyhydric alcohol=(0.5–5)x; 4;

wherein, x is the number of moles of hydroxyl groups contained in each mole of the polyhydric alcohol; and the number of moles of each component is calculated by the number of moles of the substance itself;

wherein the polyhydric alcohol comprises at least one of ethylene glycol, diethylene glycol, triethylene glycol, tetraethylene glycol, 1,2-propanediol, 1,3propanediol, 1,4-butylene glycol, 1,6-hexanediol, polyethylene glycol 200, polyethylene glycol 400, polyethylene glycol 600, polyethylene glycol 800, 1,4-cyclohexanediol, 1,4-cyclohexane dimethanol, terephthalyl alcohol, glycerin, trimethylolpropane, pentaerythritol, xylitol and sorbitol;

wherein the reaction further comprises performing vacuum distillation, wherein conditions of the vacuum distillation comprise that a vacuum degree ranges from 0.01 to 5 kPa, a vacuum distillation temperature ranges from 170 to 230° C., and a vacuum distillation time ranges from 0.5 to 5 hours.

2. The method according to claim 1 comprising performing crystallization of a mixture containing the silicon-titanium ester polymer, a template and water to obtain the hierarchical porous TS-1 molecular sieve, wherein the crystallization is hydrothermal crystallization.

3. The method according to claim 2, wherein a molar ratio of the silicon-titanium ester polymer, template and water satisfies: template:silicon-titanium ester polymer=0.05~10, water:silicon-titanium ester polymer=5–500;

wherein, the number of moles of the template is based on the number of moles of N atoms in the template;

the number of moles of the silicon-titanium ester polymer is based on the sum of silicon content and titanium content in the silicon-titanium ester polymer;

the silicon content in the silicon-titanium ester polymer is calculated by the number of moles of $SiO_2$ and the titanium content in the silicon-titanium ester polymer is calculated by the number of moles of $TiO_2$; and the number of moles of the water is based on the number of moles of $H_2O$.

4. The method according to claim 3, wherein the molar ratio of the silicon-titanium ester polymer, template and water satisfies: template:silicon-titanium ester polymer=0.1~5; water:silicon-titanium ester polymer=30–300;

wherein, the number of moles of the template is based on the number of moles of N atoms in the template;

the number of moles of the silicon-titanium ester polymer is based on the sum of silicon content and titanium content in the silicon-titanium ester polymer;

the silicon content in the silicon-titanium ester polymer is calculated by the number of moles of $SiO_2$, and the titanium content in the silicon-titanium ester polymer is calculated by the number of moles of $TiO_2$; and the number of moles of the water is based on the number of moles of $H_2O$.

5. The method according to claim 2, wherein the template refers to at least one of organic base templates, the organic base template comprises a first template which is at least one of tetraethylammonium hydroxide, tetrapropylammonium hydroxide, tetrabutylammonium hydroxide, triethylpropylammonium hydroxide, tetrapropylammonium halide, tetraethylammonium halide, tetrabutylammonium halide and triethylpropylammonium halide.

6. The method according to claim 5, wherein the organic base template further includes a second template which is at least one of aliphatic amine and alcohol amine compounds.

7. The method according to claim 2, wherein conditions of the crystallization are as follows: the crystallization is conducted in sealed condition, a crystallization temperature ranges from 100 to 200° C., and a crystallization time under autogenous pressure does not exceed 30 days.

8. The method according to claim 7, wherein conditions of the crystallization are as follows: the crystallization is conducted in sealed condition, a crystallization temperature ranges from 120 to 180° C., and a crystallization time under autogenous pressure ranges from 1 to 15 days.

9. The method according to claim 6, wherein the second template comprises at least one of ethylamine, diethylamine, triethylamine, n-butylamine, butanediamine, hexamethylenediamine, octanediamine, monoethanolamine, diethanolamine and triethanolamine.

10. The method according to claim 7, wherein the mixture undergoes crystallization after aging, and conditions of aging are that an aging temperature is not higher than 120° C. for an aging time in a range from 0 to 100 hours.

11. The method according to claim 1, wherein the molar ratio of the silicate, titanate and polyhydric alcohol satisfies:
titanate:silicate=0.005~0.1;
(titanate+silicate):polyhydric alcohol=(0.8~1.2)x: 4;
wherein, x is the number of moles of hydroxyl groups contained in each mole of the polyhydric alcohol; and the number of moles of each component is calculated by the number of moles of the substance itself.

12. The method according to claim 1, wherein the reaction is carried out in an inactive atmosphere, a reaction temperature ranges from 100 to 160° C. and a reaction time ranges from 4 to 8 hours.

13. The method according to claim 1, wherein the silicate is at least one of compounds having a chemical formula shown in Formula I:

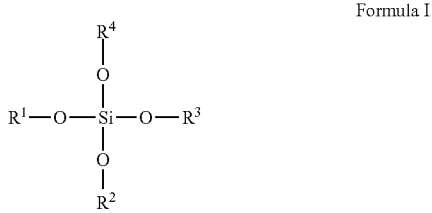

Formula I wherein, $R^1$, $R^2$, $R^3$ and $R^4$ are independently selected from $C_1$ to $C_{10}$ alkyl group.

14. The method according to claim 13, wherein the silicate comprises at least one of tetramethoxysilane, tetratetraethyl orthosilicate, tetrapropyl silicate and tetrabutyl silicate.

15. The method according to claim 1, wherein the titanate is at least one of compounds having a chemical formula shown in Formula II,

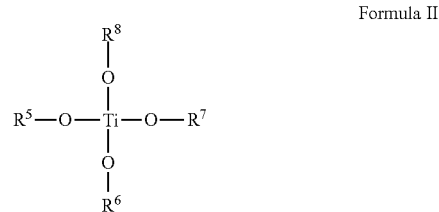

Formula II wherein, $R^5$, $R^6$, $R^7$ and $R^8$ are independently selected from $C_1$ to $C_{10}$ alkyl group.

16. The method according to claim 15, wherein the titanate includes at least one of tetraethyl titanate, tetraisopropyl titanate, tetrabutyl titanate, tetrahexyl titanate, and tetraisooctyl titanate.

17. The method according to claim 1 comprising:
a) mixing silicate, titanate and polyhydric alcohol, and then performing the reaction under stirring conditions and in an nitrogen atmosphere for protection, wherein the reaction temperature ranges from 80 to 180° C., and the reaction time ranges from 2 to 10 hours;
b) after the reaction in step a), performing vacuum distillation to prepare the silicon-titanium ester polymer, during which the vacuum degree ranges from 0.01 to 5 kPa, the vacuum distillation temperature ranges from 170 to 230° C., and the vacuum distillation time ranges from 0.5 to 5 hours;
c) mixing the silicon-titanium ester polymer obtained in step b) with an organic base template and water, and keeping the obtained mixture at a temperature not higher than 120° C. for aging for a time in a range from 0 to 100 hours to obtain a gel mixture;
d) crystalizing the gel mixture obtained in step c) under sealed conditions to obtain the hierarchical porous TS-1 molecular sieve, wherein a crystallization temperature is raised to a range from 100 to 200° C., and a crystallization time ranges from 0 to 30 days under autogenous pressure.

18. The method according to claim 1, wherein the hierarchical porous TS-1 molecular sieve comprises mesopores, and a pore diameter thereof ranges from 2 to 10 nm.

19. The method according to claim 18, wherein a particle size of the hierarchical porous TS-1 molecular sieve ranges from 100 to 500 nm.

20. The method according to claim 1, wherein the vacuum degree ranges from 0.05 to 3 kPa.

21. A method for selective oxidation of organic substances in the presence of $H_2O_2$, the method comprising subjecting the organic substances and the $H_2O_2$ to the heirarchical porous TS-1 molecular sieve prepared by the method according to claim 1.

* * * * *